United States Patent
Tracy et al.

(10) Patent No.: US 6,857,599 B2
(45) Date of Patent: Feb. 22, 2005

(54) HIGHLY SWEPT CANARD WITH LOW SWEEP WING SUPERSONIC AIRCRAFT CONFIGURATION

(75) Inventors: Richard R. Tracy, Carson City, NV (US); James D. Chase, Reno, NV (US); Ilan Kroo, Stanford, CA (US)

(73) Assignee: Aerion Corporation, Reno, NV (US)

( * ) Notice: Subject to any disclaimer, the term of this patent is extended or adjusted under 35 U.S.C. 154(b) by 0 days.

(21) Appl. No.: 10/746,744

(22) Filed: Dec. 23, 2003

(65) Prior Publication Data

US 2004/0140395 A1 Jul. 22, 2004

Related U.S. Application Data

(60) Provisional application No. 60/436,852, filed on Dec. 30, 2002.

(51) Int. Cl.$^7$ ................................................ B64C 1/00
(52) U.S. Cl. ..................................................... 244/45 A
(58) Field of Search ............................. 244/45 R, 46, 244/47, 48, 49, 45 A, 35 R, 123, 119

(56) References Cited

U.S. PATENT DOCUMENTS

| | | | | |
|---|---|---|---|---|
| 2,430,793 A | * | 11/1947 | Wells | 244/87 |
| 3,064,928 A | * | 11/1962 | Toll | 244/46 |
| 3,188,022 A | * | 6/1965 | Ornberg | 244/45 A |
| 3,926,389 A | * | 12/1975 | Mederer | 244/45 A |
| 3,942,747 A | * | 3/1976 | Wolkovitch | 244/13 |
| D268,107 S | * | 3/1983 | Enav et al. | D12/331 |
| D271,485 S | * | 11/1983 | Tucson | D12/332 |
| 4,417,708 A | * | 11/1983 | Negri | 244/45 R |
| 4,641,800 A | * | 2/1987 | Rutan | 244/218 |
| 4,741,497 A | * | 5/1988 | Fox | 244/117 R |
| 4,767,083 A | * | 8/1988 | Koenig et al. | 244/12.3 |
| 4,881,701 A | * | 11/1989 | Bullard | 244/49 |
| RE33,385 E | * | 10/1990 | Mazzoni | 244/89 |
| 5,740,984 A | * | 4/1998 | Morgenstern | 244/1 N |
| 5,842,666 A | * | 12/1998 | Gerhardt et al. | 244/15 |
| 5,992,796 A | * | 11/1999 | Smith | 244/45 A |
| D453,014 S | * | 1/2002 | Fraser | D12/319 |
| 6,575,406 B2 | * | 6/2003 | Nelson | 244/119 |
| 6,705,567 B2 | * | 3/2004 | Dong et al. | 244/13 |

* cited by examiner

Primary Examiner—Teri P. Luu
Assistant Examiner—Stephen Holzen
(74) Attorney, Agent, or Firm—William W. Haefliger

(57) ABSTRACT

An aircraft, comprising a fuselage having an elongated, narrow forward portion, a main wing carried by a rear portion of the fuselage, a canard wing carried by said fuselage forward portion and having swept back leading and trailing edges tapering toward a tip or tips, the canard wing having less lifting surface than the main wing.

14 Claims, 2 Drawing Sheets

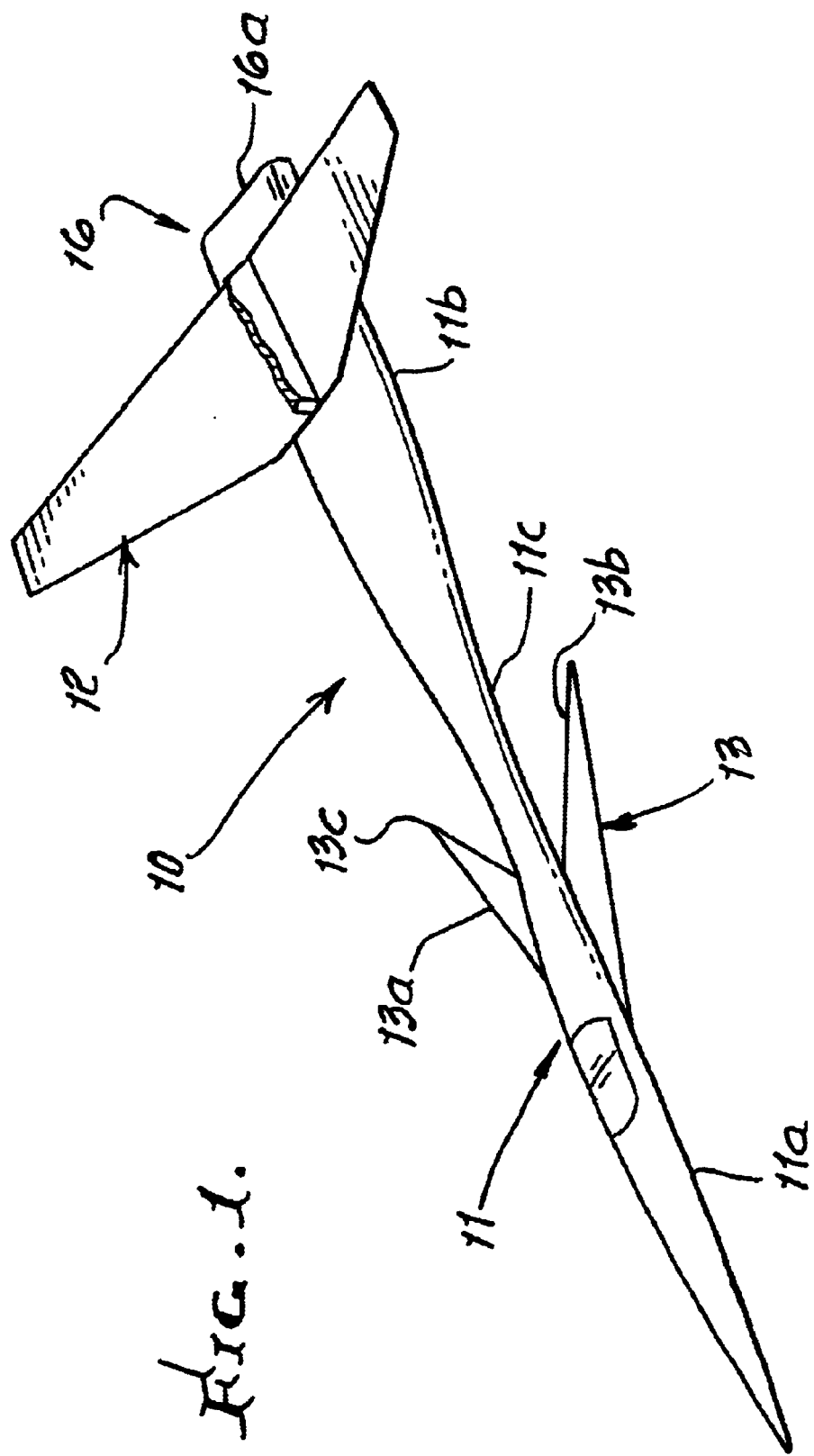

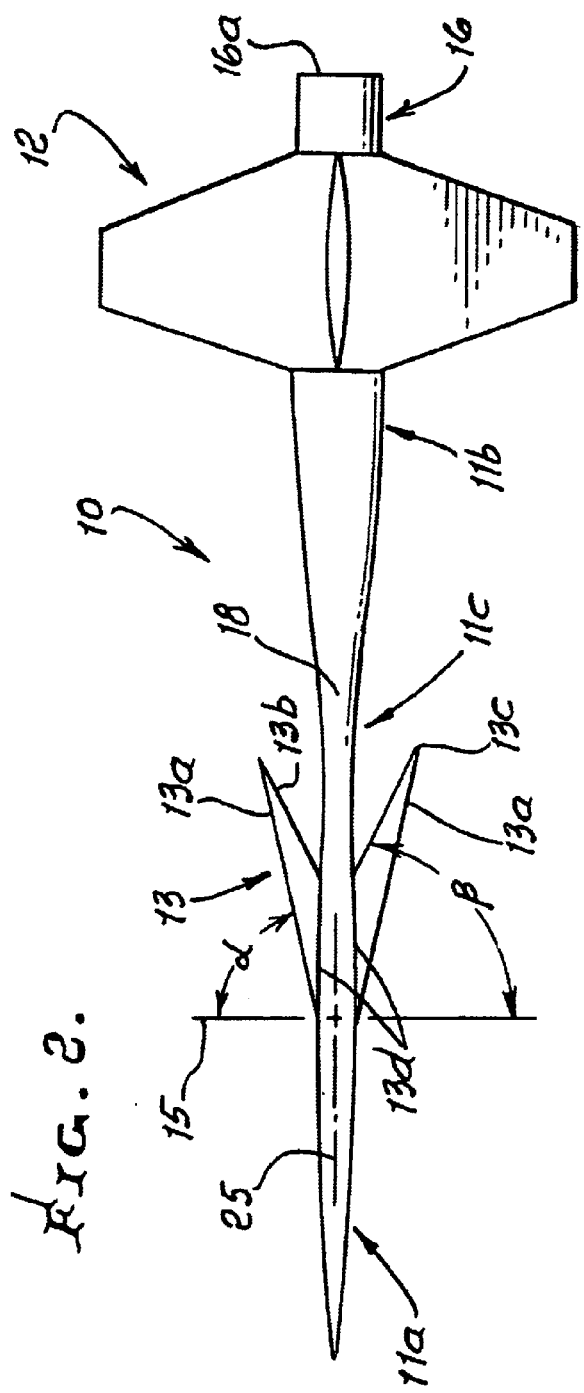
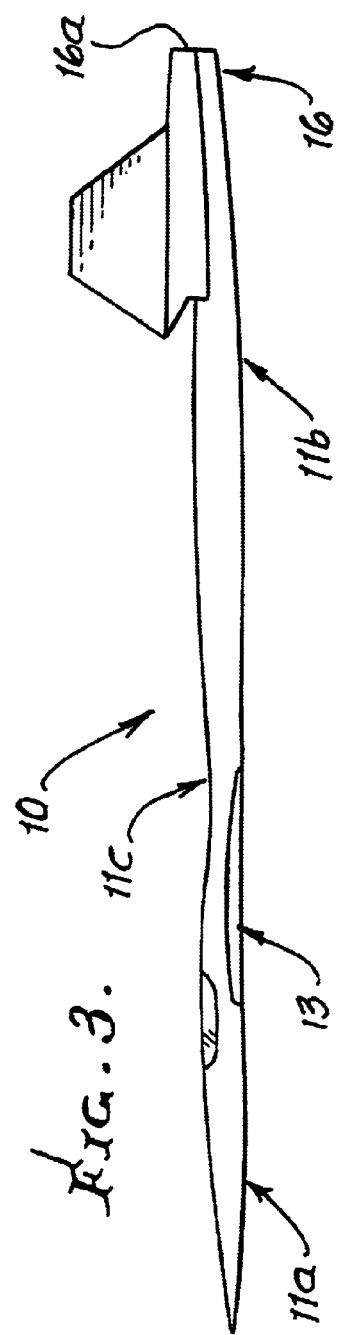

HIGHLY SWEPT CANARD WITH LOW SWEEP WING SUPERSONIC AIRCRAFT CONFIGURATION

BACKGROUND OF THE INVENTION

This application is based on provisional application Ser. No. 60/436,852, filed Dec. 30, 2002.

There is need in supersonic aircraft for means to reduce sonic boom signature at ground level, while minimizing aircraft performance penalties.

SUMMARY OF THE INVENTION

The invention objective is to provide an aircraft having a combination of an aft mounted low sweep wing capable of maintaining extensive laminar flow as described in prior Tracy patents U.S. Pat. Nos. 5,322,242, 5,518,204, 5,897,076, and 6,149,101, combined with a highly swept, forward mounted canard surface. This combination provides an improvement by reducing sonic boom signatures at minimal performance penalty.

These and other objects and advantages of the invention, as well as the details of an illustrative embodiment, will be more fully understood from the following specification and drawings, in which:

DRAWING DESCRIPTION

FIGS. 1, 2 and 3 are top, plan, and side elevation views of a preferred aircraft embodying the invention.

DETAILED DESCRIPTION

As shown in the drawings, an aircraft 10 has a) a fuselage 11 having an elongated, narrow forward portion 11a, b) a main wing 12 carried by a rear portion 11b of the fuselage, c) a canard wing 13 carried by the fuselage forward portion 11a and having swept back leading and trailing edges 13a and 13b tapering toward a tip or tips 13c, d) the canard wing having less lifting surface than the main wing. See FIG. 2.

The fuselage forward and rearward portions 11a and 11b are enlarged in cross-section, as shown, relative to the fuselage mid-section 11c.

As shown, the swept back leading edges 13a are angled (see angles α) at greater than 45° from a lateral plane 15 normal to the longitudinally axis 25 of said fuselage. The trailing edges 13b are angled (see angles β) at greater than 45° from plane 15. Also, β>α.

The main wing 12 is shown as carried by the rearwardmost one-third of the fuselage length, and forward of the rearwardmost edge or edges 16a of the engine nacelle 16. The canard wing extends at 13d from the fuselage, where 13d is located forward of the fuselage length mid point or mid region 18.

It will be understood that the canard wing is configured to provide forward lift distributed over a significant length of the aircraft and to allow a favorable distribution of volume and lift to tailor the forward shockwaves for reduced coalescence at ground level, thereby to provide reduced initial shock ground pressure rise and perceived sonic boom intensity.

The canard wings are further configured to provide forward lift characterized by production of a positive pitching moment which allows the majority of lift from the main wing to be placed far aft on the fuselage for reduced sonic boom maximum ground pressure rise and perceived noise level.

The high sweep of the canard wing effectively produces a reduction in lift curve slope, relative to that of the lower sweep main wing, thereby providing:

a) movement of the aircraft aerodynamic center aft which allows the canard wing to operate at reduced lift coefficient relative to the main wing for a given level of static longitudinal stability, and allowing the main wing to operate to higher lift coefficients at low speed, thereby allowing better overall vehicle maximum lift for improved take off and landing performance, b) reduction or elimination of drag due to lift penalty relative to typical canard configurations.

In summary, the highly swept canard surface provides forward lift distributed over a significant length and allows a favorable distribution of volume and lift to tailor the forward shockwaves for reduced coalescence at ground level. The forward lift provides a positive pitching moment which allows the majority of lift from the main wing to be placed far aft on the fuselage vehicle as typically needed for low boom designs.

The high sweep of the canard reduces its lift curve slope relative to the lesser sweep of the main wing. This moves the aerodynamic center aft and allows the canard to operate at reduced lift coefficient relative to the wing for a given level of static longitudinal stability. This reduces or eliminates the drag due to lift penalty typical of canard configurations and allows the main wing to operate to higher lift coefficients at low speed, allowing better overall vehicle maximum lift for improved takeoff and landing performance.

We claim:

1. An aircraft, comprising
   a) a fuselage having an elongated, narrow forward portion,
   b) a main wing carried by a rear portion of the fuselage,
   c) a canard wing carried by said fuselage forward portion and having swept back leading and trailing edges tapering toward tips, said leading edges being substantially straight at opposite sides of the fuselage, both extending rearwardly at angles α substantially greater than 45° from a lateral plane normal to a longitudinal axis defined by the fuselage,
   d) the canard wing having less lifting surface than the main wing.
   e) said trailing edges are angled at angle β greater than 45° from said lateral plane.

2. The aircraft of claim 1 wherein said leading edges both extend substantially rearwardly of a lateral plane intersecting the forwardmost extents of said trailing edges.

3. The aircraft of claim 1 wherein said main wing is carried by the rearwardmost one-third of the fuselage length.

4. The aircraft of claim 1 wherein said canard wing is located forward of the fuselage length mid-point.

5. The aircraft of claim 3 wherein said canard wing is located forward of the fuselage length mid-point.

6. The aircraft of claim 1 wherein the canard wing is configured to provide forward lift distributed over a significant length of the aircraft and to allow a favorable distribution of volume and lift to tailor the forward shockwaves for reduced coalescence at ground level, thereby to provide reduced initial shock ground pressure rise and perceived sonic boom intensity.

7. The aircraft of claim 6 wherein the canard wings are further configured to provide forward lift characterized by production of a positive pitching moment which allows the majority of lift from the main wing to be placed far aft on the fuselage for reduced sonic boom maximum ground pressure rise and perceived noise level.

8. The aircraft of claim 2 wherein the high sweep of the canard wing effectively produces a reduction in lift curve slope, relative to that of the lower sweep main wing, thereby providing:
   a) movement of the aircraft aerodynamic center aft which allows the canard wing to operate at reduced lift coefficient relative to the main wing for a given level of static longitudinal stability, and allowing the main wing to operate to higher lift coefficients at low speed, thereby allowing better overall vehicle maximum lift for improved take off and landing performance,
   b) reduction or elimination of drag due to lift penalty relative to typical of canard configurations,
   c) the canard wing leading and trailing edges tapering rearwardly and toward rearwardmost tips.

9. The combination of claim 1 wherein the fuselage forward portion is enlarged at the location of canard wing carriage by the fuselage, relative to fuselage mid portion cross section the canard wing leading and trailing edges extending outwardly of the said mid portion cross section.

10. The combination of claim 9 wherein the fuselage rear portion is enlarged, at the location of main wing carriage by the fuselage, relative to fuselage mid portion cross section.

11. The combination of claim 1 wherein said main wing is characterized by:
   a) said wing extending generally laterally relative to the fuselage axis, and having a leading edge angled forwardly or rearwardly relative to a normal to said axis at an angle $\Omega$ and said wing having a leading edge sharpness defined by upper and lower wing surfaces, which taper toward the leading edge to define an angle $\delta$ closely proximate the leading edge at all spanwise locations said angle $\delta$ being less then about 5 degrees,
   b) said angle $\Omega$ and sharpness $\delta$ characterized in that at design supersonic cruise flight conditions, said wing has an attached shock wave, that is the forwardmost shock wave produced in association with said wing extending generally along or rearwardly of said leading edge, whereby laminar boundary layer conditions are maintained over the said leading edge and adjacent the surface of the wing.

12. The combination of claim 1, wherein said wing has leading and trailing edges, a longitudinal axis extending directionally between said edges, wing tip ends and upper and lower surfaces, said wing having a main portion and a tip portion,
   a) said main portion of the wing having leading edge sweep angularity $\lambda$, the absolute value of which is less than about 30° at all spanwise locations, wherein said leading edge sweep angularity at any spanwise location is defined as the angle between the tangent to the leading edge of said wing at said location, and the plane normal to the longitudinal axis of said airplane,
   b) the wing having leading edge sharpness defined by upper and lower wing surfaces which taper toward said leading edge to define an angle closely proximate said leading edge at all spanwise locations, and which is less than about 5°,
   c) the wing having an airfoil cross sectional shape at each spanwise location, defined by the intersections of said upper and lower surfaces with a vertical plane parallel to said longitudinal axis at said spanwise location, said airfoil cross sectional shape being free from concavity for the majority of its longitudinal length measured from said leading edge,
   d) the wing having a thickness-to-chord ratio which is less than about 0.02, as an average along the span of said wing, wherein said thickness-to-chord ratio at any spanwise location is defined as the maximum vertical height of said airfoil cross sectional shape of said spanwise location, divided by said longitudinal length at said spanwise location,
   e) said wing defining a substantial portion of the total lifting surface defined by the airplane.

13. The combination of claim 1 wherein:
   a) said wing extends generally laterally relative to said axis, and having a leading edge angled forward or rearwardly relative to a normal to said axis at an angle $\lambda$ and said wing having leading edge sharpness defined by upper and lower wing surfaces, which taper toward the leading edge to define an angle $\delta$, closely proximate the leading edge at all spanwise locations,
   b) said angle $\lambda$ and sharpness $\delta$ characterized in that at design supersonic cruise flight conditions, said wing has an attached shock wave, that is, the forwardmost shock wave produced in association with said wing and extends generally along or rearwardly of said leading edge, whereby laminar boundary layer conditions are maintained over the said leading edge and adjacent the surface of the wing,
   c) the wing and fuselage having skins, and there being cooling means selectively installed in thermal contact with said respective skins.

14. The combination of claim 1 wherein said wing has leading and trailing edges, a longitudinal axis extending directionally between said edges wing tip ends and upper and lower surfaces, said wing having a main portion and a tip portion:
   a) said main portion of the wing having leading edge sweep angularity $\Omega$, the absolute value of which is less than 30 degrees at all spanwise locations, wherein said leading edge sweep angularity at any spanwise location is defined as the angle between the tangent to the leading edge of said wing at said location, and the plane normal to the longitudinal axis of said airplane,
   b) the wing having leading edge sharpness defines by upper and lower wing surfaces which taper toward said leading edge to define an angle closely proximate said leading edge at all spanwise locations, and which is less than about 5 degrees,
   c) the wing having an airfoil cross sectional shape at each spanwise location, defined by the intersections of said upper and lower surfaces with a vertical plane parallel to said longitudinal axis at said spanwise location, said airfoil cross sectionalshape being free form concavity for the majority of its longitudinal length measured from said leading edge,
   d) the wing having a thickness-to-chord ratio which is less than about 0.02, as an average along the span of said wing, wherein said thickness-to-chord ratio at any spanwise location is defined as the maximum vertical height of said airfoil cross sectional shape of said spanwise location, divided by said longitudinal length at said spanwise location.

* * * * *